(12) United States Patent
Kim

(10) Patent No.: US 9,318,783 B2
(45) Date of Patent: Apr. 19, 2016

(54) POSITIVE ELECTRODE FOR LITHIUM AIR BATTERY, METHOD OF PREPARING SAME, AND LITHIUM AIR BATTERY INCLUDING SAME

(71) Applicant: SAMSUNG SDI CO., LTD., Yongin-si, Gyeonggi-do (KR)

(72) Inventor: In Kim, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 98 days.

(21) Appl. No.: 14/071,855

(22) Filed: Nov. 5, 2013

(65) Prior Publication Data

US 2014/0255800 A1    Sep. 11, 2014

(30) Foreign Application Priority Data

Mar. 8, 2013    (KR) .................. 10-2013-0025156

(51) Int. Cl.
*H01M 4/90* (2006.01)
*H01M 4/88* (2006.01)
*H01M 12/08* (2006.01)
*H01M 4/92* (2006.01)

(52) U.S. Cl.
CPC ............ *H01M 12/08* (2013.01); *H01M 4/8803* (2013.01); *H01M 4/8828* (2013.01); *H01M 4/9041* (2013.01); *H01M 4/9083* (2013.01); *H01M 4/926* (2013.01); *Y02E 60/122* (2013.01); *Y02E 60/50* (2013.01)

(58) Field of Classification Search
None
See application file for complete search history.

(56) References Cited

U.S. PATENT DOCUMENTS

2008/0176124 A1* 7/2008 Imagawa et al. ................ 429/27

FOREIGN PATENT DOCUMENTS

| KR | 10-2002-0045781 A | 6/2002 |
|---|---|---|
| KR | 10-2007-0042551 A | 4/2007 |
| KR | 10-2010-0051348 A | 5/2010 |

* cited by examiner

*Primary Examiner* — Patrick Ryan
*Assistant Examiner* — Christopher Domone
(74) *Attorney, Agent, or Firm* — Lee & Morse, P.C.

(57) ABSTRACT

A positive electrode for a lithium air battery includes a current collector, and a positive electrode catalyst layer on the current collector. The positive electrode catalyst layer includes a first conductive material supported on a binder, a second conductive material on the first conductive material, and a catalyst supported on the second conductive material.

15 Claims, 6 Drawing Sheets

POSITIVE ELECTRODE FOR LITHIUM AIR BATTERY, METHOD OF PREPARING SAME, AND LITHIUM AIR BATTERY INCLUDING SAME

CROSS-REFERENCE TO RELATED APPLICATION

Korean Patent Application No. 10-2013-0025156 filed on Mar. 8, 2013, in the Korean Intellectual Property Office, and entitled: "POSITIVE ELECTRODE FOR LITHIUM AIR BATTERY, METHOD OF PREPARING SAME, AND LITHIUM AIR BATTERY INCLUDING SAME," is incorporated by reference herein in its entirety.

BACKGROUND

1. Field

Embodiments relate to a positive electrode for a lithium air battery, a method of preparing the same, and a lithium air battery including the same.

2. Description of the Related Art

The recent development of high tech electronic industries has spurred the development of lighter and smaller of electronic equipment. Accordingly, portable electronic devices have been increasingly used. In addition, lithium air batteries have been developed as a power source for the portable electronic devices.

Lithium air batteries achieve a remarkably higher energy density than lithium ion batteries by contacting lithium with the air. Lithium air batteries also have an advantage of being lighter and smaller. In addition, when applied to an electric vehicle, lithium air batteries may increase the mileage of the electric vehicle to about 500 km or more compared with the lithium ion batteries, which may provide a mileage of only about 160 km. Accordingly, research on the lithium air batteries as a useful power source for an electric vehicle has been actively conducted.

SUMMARY

Embodiments are directed to a positive electrode for a lithium air battery, the positive electrode including a current collector, and a positive electrode catalyst layer on the current collector. The positive electrode catalyst layer includes a first conductive material supported on a binder, a second conductive material on the first conductive material, and a catalyst supported on the second conductive material.

The second conductive material may be on a surface of the first conductive material supported on the binder.

The second conductive material may be on a surface of the first conductive material supported on the binder. The catalyst may be on a surface of the second conductive material.

The catalyst may be Pt, Au, Ru, Pd, Co, Cr, or a combination thereof.

The first conductive material and the second conductive material may be the same or different and may be graphite, denka black, ketjen black, acetylene black, carbon nanotube, a carbon nano fiber, a carbon nano wire, a carbon nano ball, activated carbon, graphene, or a combination thereof.

An amount of the catalyst may range from about 5 wt % to about 60 wt % based on 100 wt % of the positive electrode catalyst layer.

An amount of the binder may range from about 5 wt % to about 30 wt % based on 100 wt % of the positive electrode catalyst layer.

The mixing ratio of the first conductive material and the second conductive material may be about 90:10 to 10:90 weight ratio.

The binder may be polytetrafluoroethylene, polyvinylidene fluoride, polyvinylalcohol, carboxylmethylcellulose, hydroxypropylcellulose, diacetylcellulose, polyvinylchloride, carboxylated polyvinylchloride, an ethylene oxide-containing polymer, polyvinylpyrrolidone, polyurethane, polyethylene, polypropylene, a styrene-butadiene rubber, an acrylated styrene-butadiene rubber, an epoxy resin, nylon, poly(perfluorosulfonic acid), poly(tetrafluoroethylene), fluorinated ethylene-propylene, sodium carboxylmethylcellulose, a styrene butadiene rubber, or a combination thereof.

Embodiments are also directed to a method of preparing positive electrode for a lithium air battery including supporting a first conductive material on a binder to form a first conductive material supported on a binder, mixing the binder having the first conductive material supported thereon and a second conductive material, the second conductive material having a catalyst supported thereon, adding the resultant mixture to a solvent to prepare a catalyst composition, and coating a current collector with the catalyst composition.

The first conductive material may be supported on the binder in a first solvent.

The second conductive material having the catalyst supported thereon is present in a liquid mixture that further includes a second solvent.

Embodiments are also directed to a lithium air battery including the positive electrode positive electrode as described above, a negative electrode, and an electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
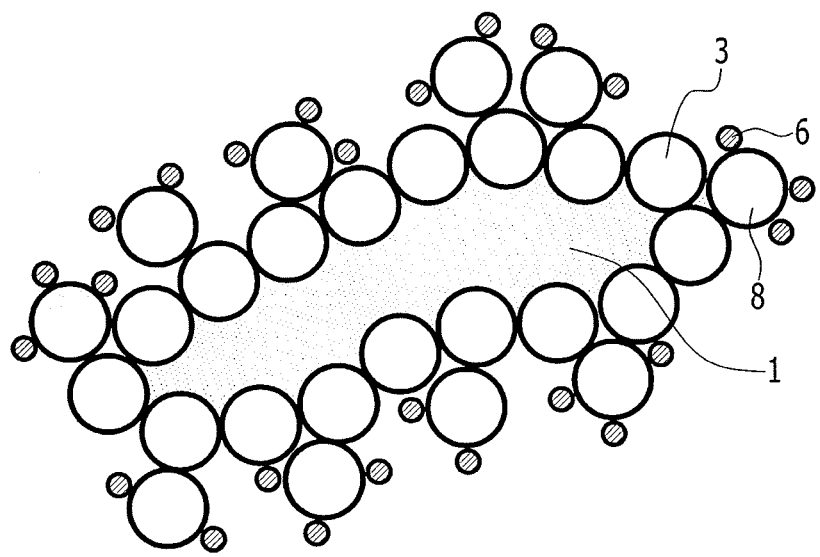
FIG. 1 illustrates a schematic view showing the composition of a positive electrode catalyst layer in a positive electrode according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

An embodiment relates to a positive electrode for a lithium air battery. The positive electrode for a lithium air battery may include a positive electrode catalyst layer including a first conductive material supported on a binder and a second conductive material having a catalyst supported thereon; and a current collector.

The second conductive material may be positioned on the surface of the first conductive material supported on the binder. The second conductive material may be positioned on the surface of the first conductive material supported on a binder, and the catalyst may be positioned on the surface of the second conductive material.

Referring to FIG. 1, the first conductive material 3 may be supported on a binder 1 in a positive electrode catalyst layer. The first conductive material 3 may be positioned on a surface of the binder 1, and the second conductive material 8 may be positioned on a surface of the first conductive material 3. In addition, a catalyst 6 may be positioned on the surface of the second conductive material 8.

As shown in FIG. 1, the first conductive material 3 supported on the binder 1 may act as a frame maintaining the structure of the positive electrode catalyst layer. The catalyst 6 supported on the second conductive material 8 may be present on the surface of the second conductive material 8. For example, the catalyst 6 may be present only on the surface of the second conductive material 8 and not on the surface of the binder 1. Accordingly, in the positive electrode according to this embodiment, there is no inactive catalyst positioned between the conductive material and the binder and not contacting a fuel and lithium ions and thus, not participating in an electrical/chemical reaction. As a result, all the catalyst present in the positive electrode may be available to participate in the electrical/chemical reaction. Thereby, the catalyst efficiency may be improved. In addition, even though the catalyst 6 may be present between the first conductive material 3 and the second conductive material 8, the first and second conductive materials maintain a predetermined shape, so that a reduced amount of the catalyst is buried between the binder and the conductive material. Accordingly, most of the catalyst 6 may sufficiently contact an impregnated electrolyte solution and thus, may smoothly catalyze an electrical/chemical reaction.

Figure 2:
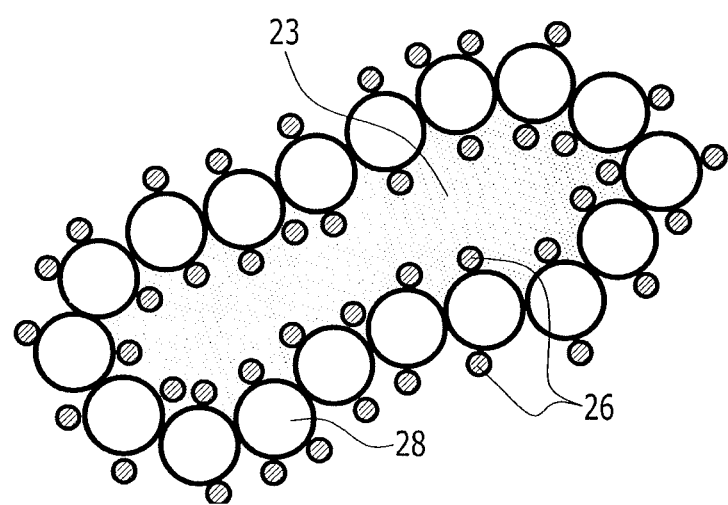
FIG. 2 illustrates a schematic view showing the composition of a positive electrode catalyst layer in a conventional positive electrode.

Conventionally, a positive electrode may be formed by mixing a catalyst supported on a conductive material 28 with a binder 28. In such a case, as shown in FIG. 2, the catalyst 26 may present between the binder 28 and the conductive material 28 For example, some of the catalyst 26 may be surrounded by the binder 28 and thus, may not contact a fuel and lithium ions and may not participate in an electrical/chemical reaction. Accordingly, efficiency of the catalyst may be deteriorated.

On the other hand, the catalyst in the positive electrode according to the present embodiment as described above is not present between the binder and the conductive material. Accordingly, the catalyst may have excellent efficiency. A much larger reaction area may be provided than in the conventional positive electrode, and the positive electrode may provide an improved output and performance of a lithium air battery.

The positive electrode according to the present embodiment uses oxygen, such as oxygen gas, as a positive electrode fuel. The oxygen in a lithium air battery promotes formation of a lithium oxide and causes a battery reaction.

The catalyst is used to further smooth the battery reaction and increases oxidation and reduction capability of oxygen as a positive electrode fuel. The catalyst may be Pt, Au, Ru, Pd, Co, Cr, or a combination thereof.

The positive electrode catalyst layer for the positive electrode may further include a positive active material. The positive active material may be Li, $Li^+$, $Li_2O_2$, $Li_2O$, LiOH, or a combination thereof.

The first and the second conductive materials may be the same or different and may include graphite, carbon black, denka black, ketjen black, acetylene black, carbon nanotube, a carbon nano fiber, a carbon nano wire, a carbon nano ball, activated carbon, graphene, or a combination thereof.

The catalyst may be included in an amount ranging from about 5 wt % to about 60 wt % based on 100 wt % of the positive electrode catalyst layer. When the catalyst is more than about 5%, the amount of the catalyst may be sufficient to provide electrochemical activity. When the catalyst is less than about 60%, battery manufacturing costs may be reduced.

The binder may be included in an amount ranging from about 5 wt % to about 30 wt % based on 100 wt % of the positive electrode catalyst layer.

The first conductive material and the second conductive material may be present at a mixing ratio of 90:10 to 10:90 wt % in the positive electrode catalyst layer. The amount of the first conductive material and the second conductive material are suitably controlled depending on the amount of the catalyst and the binder.

The amount of supporting the catalyst on the second conductive material and the amount of supporting the first conductive material on the binder are suitably controlled, when the amounts of the catalyst and the binder, and the mixing ratio of the first conductive material and the second conductive material are fallen into the above range.

The amount of supporting the catalyst on the second conductive material and the amount of supporting the first conductive material on the binder are suitably controlled, when the amounts of the catalyst and the binder, and the mixing ratio of the first conductive material and the second conductive material are fallen into the above range. The binder may be polytetrafluoroethylene, polyvinylidene fluoride, polyvinylalcohol, carboxylmethylcellulose, hydroxypropylcellulose, diacetylcellulose, polyvinylchloride, carboxylated polyvinylchloride, an ethylene oxide-containing polymer, polyvinylpyrrolidone, polyurethane, polyethylene, polypropylene, a styrene-butadiene rubber, an acrylated styrene-butadiene rubber, an epoxy resin, nylon, poly(perfluorosulfonic acid), poly(tetrafluoroethylene), fluorinated ethylene-propylene, sodium carboxylmethylcellulose, a styrene butadiene rubber, or a combination thereof.

The current collector may be copper, nickel, stainless steel, titanium, or aluminum. The current collector may be in the form of a porous substrate having a shape such as a mesh, foam, or the like.

The positive electrode according to the embodiment may have an oxygen reduction characteristic output that is improved by about 20% to about 50% compared with a conventional positive electrode, even though the same amount of a catalyst is used.

Another embodiment provides a method of preparing the positive electrode. The method may include supporting a first conductive material on a binder to form the first conductive material supported on the binder, mixing the first conductive material supported on the binder, and a second conductive material having a catalyst supported thereon; adding a solvent to the resultant mixture to prepare a catalyst composition, and coating a current collector with the catalyst composition.

The process of supporting the first conductive material on the binder may be performed in a first solvent, and the second conductive material having the catalyst supported thereon may be prepared in a form of liquid phase by further including a second solvent. According to an implementation, the preparing process may include a dry method using no second solvent or a wet method using the second solvent.

Figure 3:
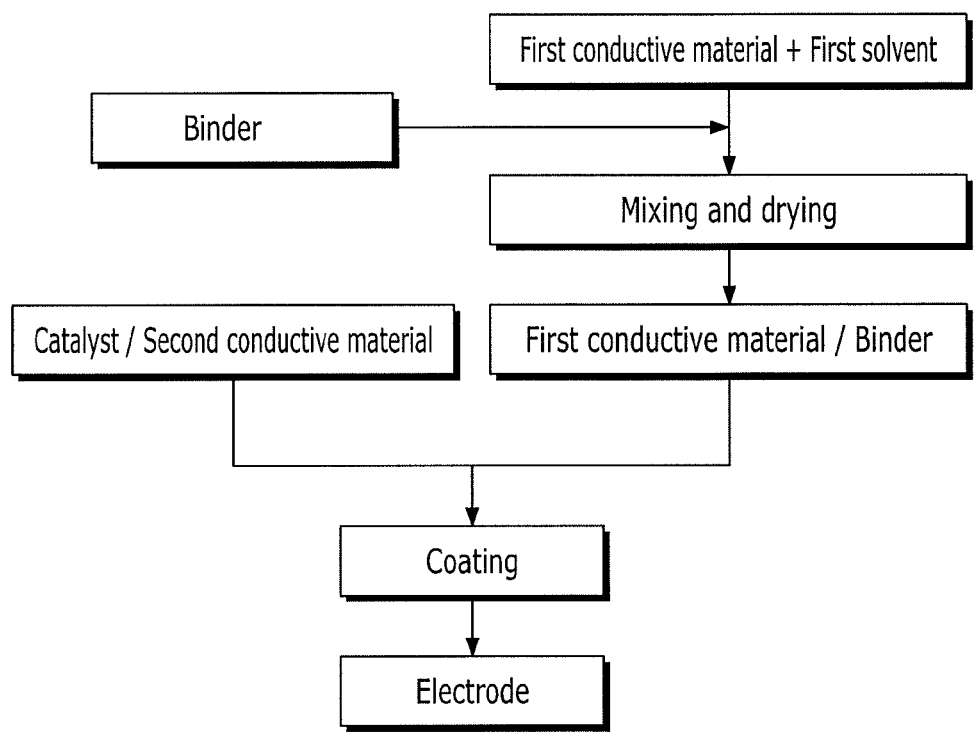
FIG. 3 illustrates a flow chart schematically showing a dry method of preparing the positive electrode according to an embodiment.

The dry method using no second solvent is illustrated in FIG. 3. As shown in FIG. 3, the binder may be mixed with the first conductive material to support the first conductive material on the binder. The first conductive material may be added to the first solvent and may be prepared in a form of liquid phase. The first solvent may be an alcohol, such as methanol, ethanol, isopropanol, or the like, water, or a combination thereof.

The binder may be added to a solvent and prepared in a form of liquid phase such as a dispersion solution or the like. The solvent to which the binder is added may be methanol, ethanol, isopropyl alcohol, acetone, water, or a combination thereof.

Figure 6:
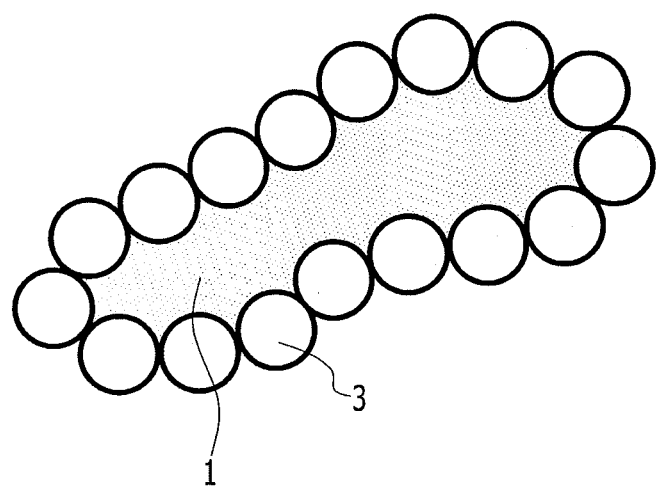
FIG. 6 illustrates a drawing schematically showing a first conductive material supported on a binder according to an embodiment.

When the mixture is dried, the first conductive material 3 is supported on the binder 1, as shown in FIG. 6. The drying may be performed at a temperature ranging from about 10° C. to about 150° C. The drying may be performed for one hour or more and may be appropriately adjusted as desired.

Then, the first conductive material supported on a binder is mixed with the catalyst supported on a second conductive material. Then, a solvent is added to the obtained mixture to prepare a catalyst composition, and the catalyst composition is coated on a current collector to prepare a positive electrode. The solvent may include methanol, ethanol, isopropyl alcohol, acetone, water, or a combination thereof.

Figure 4:
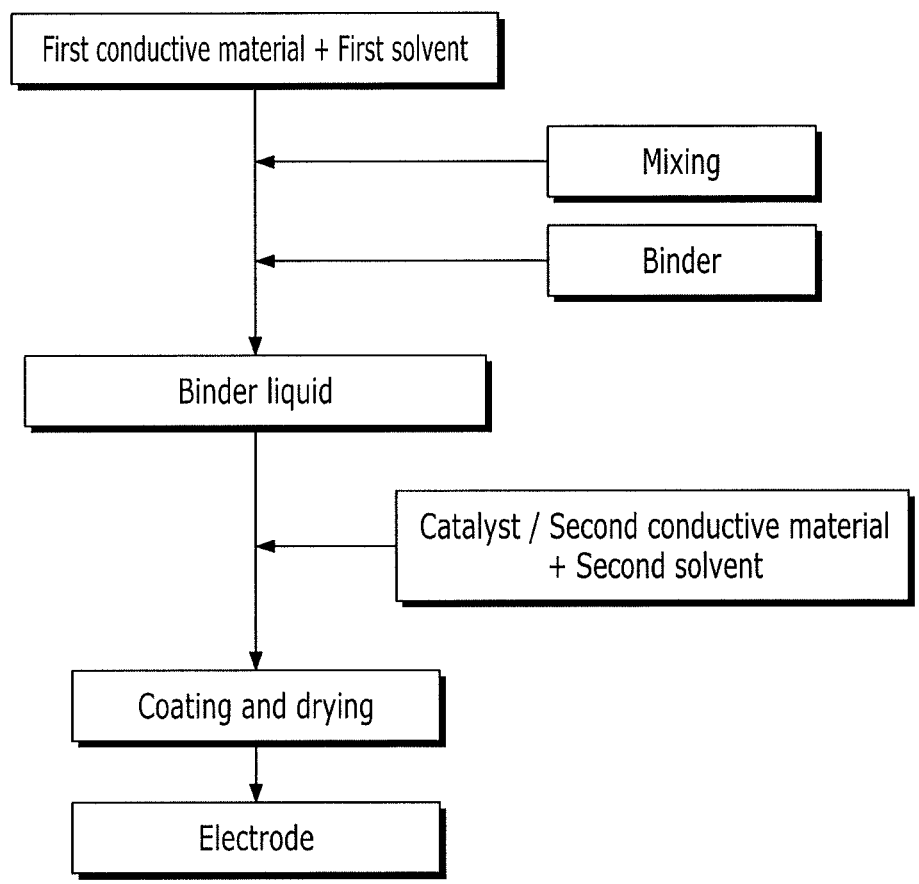
FIG. 4 illustrates a flow chart schematically showing a wet method of preparing the positive electrode according to an embodiment.

A wet method of preparing a positive electrode using a second solvent according to another embodiment is illustrated in FIG. 4.

As shown in FIG. 4, a binder and a first conductive material are mixed in a first solvent to prepare a binder liquid including the first conductive material supported on the binder. The solvent may include an alcohol such as methanol, ethanol, isopropanol, or the like, water, or a combination thereof. The first conductive material may be supported on the binder during the mixing process.

The binder liquid is mixed with a catalyst liquid including the second conductive material with the catalyst supported thereon and a second solvent to prepare a catalyst composition. The second solvent may include an alcohol such as methanol, ethanol, isopropanol, or the like, an organic solvent such as acetone or the like, water, or a combination thereof.

Then, the catalyst composition is coated on a current collector to prepare a positive electrode.

According to yet another embodiment, a lithium air battery including the positive electrode, a negative electrode, and an electrolyte is provided.

The negative electrode may include a negative active material layer including a negative active material, and a current collector.

The negative active material may include a metal, an alloy, metal oxide, metal nitride, a carbon-based material, or the like. In the metal, alloy, metal oxide or metal nitride, the metal may be Li, Na, K, or a combination thereof. The carbon-based material may be Vulcan carbon black, denka black, carbon nanotube, graphene, graphite, or a combination thereof.

The negative active material layer may include a conductive material and/or a binder as well as the negative active material. Any suitable electrically conductive material may be used as a conductive material that does not cause a chemical change. Examples of the conductive material include carbon-based materials such as natural graphite, artificial graphite, carbon black, acetylene black, ketjen black, a carbon fiber, or the like, metal-based materials of a metal powder or a metal fiber including nickel, aluminum, silver, or the like; conductive polymers such as polyphenylene derivatives; or a mixture thereof.

The binder may be polyvinylidene fluoride, polyvinylalcohol, carboxylmethylcellulose, hydroxypropylcellulose, diacetylcellulose, polyvinylchloride, carboxylated polyvinylchloride, an ethylene oxide-containing polymer, polyvinylpyrrolidone, polyurethane, polytetrafluoroethylene, polyethylene, polypropylene, a styrene-butadiene rubber, an acrylated styrene-butadiene rubber, an epoxy resin, nylon, or the like, as examples.

The current collector may be copper, nickel, stainless steel, or titanium. The current collector may be in the form of a porous substrate having a shape such as mesh, foam, or the like.

The electrolyte may include a lithium salt dissolved in a non-aqueous organic solvent. The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent may include cyclohexanone or the like. The alcohol-based solvent may include ethyl alcohol, isopropyl alcohol, or the like. Examples of the aprotic solvent include nitriles such as R—CN (where R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio may be controlled in accordance with a desirable battery performance.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI and LiB$(C_2O_4)_2$ (lithium bis(oxalato)borate; LiBOB).

In the electrolyte solution, the lithium salt may have a concentration of about 0.1M to about 2.0M.

According to an embodiment, an electrolyte for a lithium air battery may include a polymer composite electrolyte and a suitable liquid electrolyte or solid electrolyte.

Figure 5:
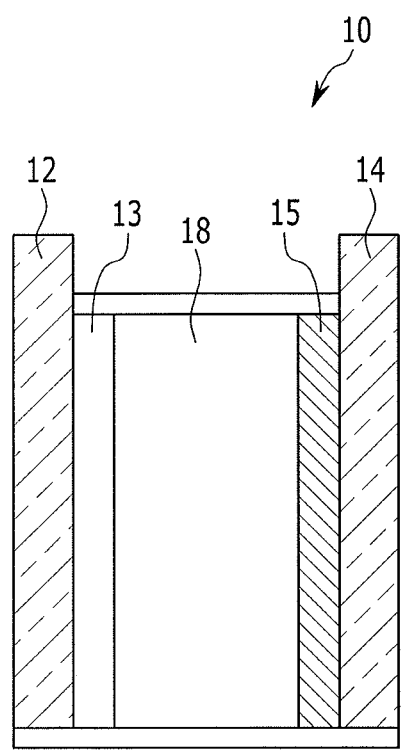
FIG. 5 illustrates a schematic view showing a structure of a lithium battery air according to one embodiment.

FIG. 5 is a schematic view showing a structure of a lithium battery air according to one embodiment.

Referring to FIG. 5, the lithium air battery 10 according to one embodiment includes a positive electrode 15 disposed on a first current collector 14, a negative electrode 13 contacting a second current collector 12, and electrolyte 18 disposed between the positive electrode 1 and the negative electrode 13.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

Example 1

Vulcan carbon (carbon black, Cabot Co.) was added to a mixed solvent prepared by mixing ethanol and water in a volume ratio of 50:50, and polytetrafluoroethylene was added thereto and mixed therewith, preparing a binder/carbon liquid. Next, this mixture was dried at 100° C. under vacuum for 10 hours. Herein, the polytetrafluoroethylene was supported on the Vulcan carbon (carbon black, Cabot Co.). The binder/carbon liquid included 25 wt % of the polytetrafluoroethylene and 75 wt % of the Vulcan carbon (carbon black, Cabot Co.) based on 100 wt % of the total solid content therein.

Then, a catalyst liquid was prepared by adding platinum supported on Vulcan carbon (carbon black, Cabot Co.) (Pt/C, the loading amount of Pt: 10 wt %) to a mixed solvent prepared by mixing isopropyl alcohol and water in a volume ratio of 50:50.

The binder liquid and the catalyst liquid were mixed in a weight ratio of 50:50 to prepare a catalyst composition.

The catalyst composition was coated on an Al current collector and dried, fabricating a positive electrode having a positive electrode catalyst layer. The positive electrode catalyst layer included 5 wt % of Pt based on 100 wt % of the total weight of the positive electrode catalyst layer.

Comparative Example 1

A catalyst liquid was prepared by adding platinum supported on Vulcan carbon (carbon black, Cabot Co.) (Pt/C, the amount of supported Pt: 10 wt %) in a mixed solvent prepared by mixing isopropyl alcohol and water in a volume ratio of 50:50.

Next, polytetrafluoroethylene was added to the catalyst liquid. Herein, the polytetrafluoroethylene was included in an amount of 25 wt % based on 100 wt % of the total solid content.

The catalyst composition was coated on an Al current collector and dried, fabricating a positive electrode having a positive electrode catalyst layer on the Al current collector. The positive electrode catalyst layer included 7.5 wt % of Pt based on 100 wt % of the total weight of the positive electrode catalyst layer.

The positive electrodes according to Example 1 and Comparative Example 1 were used to prepare respective lithium air battery cells. Herein, graphite was used as a negative electrode, and an electrolyte solution was prepared by dissolving 1.15M $LiPF_6$ in a mixed solvent prepared by mixing ethylene carbonate, dimethyl carbonate, and ethylmethyl carbonate in a mole ratio of 1:1:1.

The lithium air battery cells were charged and discharged 20 times under a current condition of 4.1 V and 500 mA, and output characteristics were measured. It was found that the lithium air battery cell using the positive electrode according to Example 1 had about a 24% improved output compared with the lithium air battery cell using the positive electrode according to Comparative Example 1.

By way of summation and review, embodiments provide a positive electrode for a lithium air battery having improved output characteristics due to a large reaction area of a catalyst.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A positive electrode for a lithium air battery, the positive electrode comprising:
 a current collector; and
 a positive electrode catalyst layer on the current collector, the positive electrode catalyst layer including a first conductive material supported on a binder and a catalyst supported on a second conductive material,
 wherein the catalyst is spaced apart from the binder such that the first conductive material is between the binder and the catalyst.

2. The positive electrode for a lithium air battery as claimed in claim 1, wherein the positive electrode catalyst layer includes:
 the first conductive material supported on the binder,
 the second conductive material on the first conductive material, and
 the catalyst supported on the second conductive material.

3. The positive electrode for a lithium air battery as claimed in claim 1, wherein the second conductive material is on a surface of the first conductive material supported on the binder.

4. The positive electrode for a lithium air battery as claimed in claim 1, wherein:
 the second conductive material is on a surface of the first conductive material supported on the binder, and
 the catalyst is on a surface of the second conductive material.

5. The positive electrode for a lithium air battery as claimed in claim 1, wherein the catalyst is Pt, Au, Ru, Pd, Co, Cr, or a combination thereof.

6. The positive electrode for a lithium air battery as claimed in claim 1, wherein the first conductive material and the second conductive material are the same or different and are graphite, denka black, ketjen black, acetylene black, carbon nanotube, a carbon nano fiber, a carbon nano wire, a carbon nano ball, activated carbon, graphene, or a combination thereof.

7. The positive electrode for a lithium air battery as claimed in claim 1, wherein an amount of the catalyst ranges from about 5 wt % to about 60 wt % based on 100 wt % of the positive electrode catalyst layer.

8. The positive electrode for a lithium air battery as claimed in claim 1, wherein the binder is polytetrafluoroethylene, polyvinylidene fluoride, polyvinylalcohol, carboxylmethylcellulose, hydroxypropylcellulose, diacetylcellulose, polyvinylchloride, carboxylated polyvinylchloride, an ethylene oxide-containing polymer, polyvinylpyrrolidone, polyurethane, polyethylene, polypropylene, a styrene-butadiene rubber, an acrylated styrene-butadiene rubber, an epoxy resin, nylon, poly(perfluorosulfonic acid), poly(tetrafluoroethylene), fluorinated ethylene-propylene, sodium carboxylmethylcellulose, a styrene butadiene rubber, or a combination thereof.

9. A method of preparing positive electrode for a lithium air battery, the method comprising:
 supporting a first conductive material on a binder to form a first conductive material supported on a binder;
 mixing the binder having the first conductive material supported thereon and a second conductive material, such that the second conductive material has a catalyst supported thereon and the catalyst is spaced apart from the binder, the first conductive material being between the binder and the catalyst;

adding the resultant mixture to a solvent to prepare a catalyst composition; and coating a current collector with the catalyst composition.

10. The method as claimed in claim 9, wherein the first conductive material is supported on the binder in a first solvent.

11. The method as claimed in claim 9, wherein the second conductive material having the catalyst supported thereon is present in a liquid mixture that further includes a second solvent.

12. The method as claimed in claim 9, wherein the first conductive material supported on a binder and the catalyst supported on a second conductive material are present in a mixing ratio of about 20:80 to about 80:20 wt %.

13. A lithium air battery, comprising the positive electrode positive electrode as claimed in claim 1, a negative electrode; and an electrolyte.

14. The positive electrode for a lithium air battery as claimed in claim 1, wherein the catalyst does not contact the binder.

15. The positive electrode for a lithium air battery as claimed in claim 1, wherein the positive electrode is prepared by:

supporting a first conductive material on a binder to form a first conductive material supported on a binder;

mixing the binder having the first conductive material supported thereon and a second conductive material, such that the second conductive material has a catalyst supported thereon;

adding the resultant mixture to a solvent to prepare a catalyst composition; and coating a current collector with the catalyst composition.

* * * * *